United States Patent
Lindgren et al.

(10) Patent No.: US 8,599,070 B2
(45) Date of Patent: Dec. 3, 2013

(54) DEVICE AND A METHOD FOR ESTABLISHING COMMUNICATION BETWEEN NODES IN A WIRELESS COMMUNICATION SYSTEM

(75) Inventors: Ulf Lindgren, Vastra Frolunda (SE); Fredrik Athley, Kullavik (SE); Mikael Coldrey, Landvetter (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 188 days.

(21) Appl. No.: 13/140,498

(22) PCT Filed: Dec. 22, 2008

(86) PCT No.: PCT/EP2008/068163
§ 371 (c)(1),
(2), (4) Date: Jun. 17, 2011

(87) PCT Pub. No.: WO2010/072248
PCT Pub. Date: Jul. 1, 2010

(65) Prior Publication Data
US 2011/0248889 A1    Oct. 13, 2011

(51) Int. Cl.
*H04B 7/00* (2006.01)
(52) U.S. Cl.
USPC .......................................................... 342/367
(58) Field of Classification Search
USPC .......................................................... 342/367
See application file for complete search history.

(56) References Cited

U.S. PATENT DOCUMENTS

| | | | |
|---|---|---|---|
| 6,870,515 B2 * | 3/2005 | Kitchener et al. | 343/853 |
| 8,254,487 B2 * | 8/2012 | Tsai et al. | 375/267 |
| 2007/0135168 A1 * | 6/2007 | Liu | 455/562.1 |
| 2007/0254603 A1 | 11/2007 | Li et al. | |
| 2008/0260058 A1 | 10/2008 | Li | |
| 2009/0041150 A1 * | 2/2009 | Tsai et al. | 375/267 |

FOREIGN PATENT DOCUMENTS

| | | |
|---|---|---|
| CN | 1377202 A | 10/2002 |
| CN | 1402914 A | 3/2003 |
| CN | 1700801 A | 11/2005 |
| CN | 101194440 A | 6/2008 |
| CN | 101297514 A | 10/2008 |
| WO | 2006113872 A1 | 10/2006 |

OTHER PUBLICATIONS

Office Action dated Jul. 3, 2013, issued in Chinese Patent Application No. 200880132536.1, 7 pages.

* cited by examiner

*Primary Examiner* — Harry Liu
(74) *Attorney, Agent, or Firm* — Rothwell, Figg, Ernst & Manbeck, P.C.

(57) ABSTRACT

The present invention relates to a first node (1) in a wireless communication system (2), where the first node (1) comprises at least two antenna ports (3, 4), and is arranged for communication with a second node (5) via a channel (H) by means of at least one antenna radiation lobe (6, 7, 8, 9). The second node (5) comprises at least two antenna ports (10, 11) and is positioned at a certain direction (12) in relation to the first node (1), and is arranged for transmitting one of at least two precoding weight set requests to the first node (1) at certain times. Each transmitted precoding weight set request is chosen in dependence of the channel (H) such that the first node (1) receives instructions for a certain beam-forming. The first node (1) is arranged to apply such a beam-forming that the precoding weight set requests received from the second node (5) have one certain distribution, of a set of at least one certain distribution, over a certain time period.

26 Claims, 2 Drawing Sheets

DEVICE AND A METHOD FOR ESTABLISHING COMMUNICATION BETWEEN NODES IN A WIRELESS COMMUNICATION SYSTEM

CROSS-REFERENCE TO RELATED APPLICATION

This application is a 35 U.S.C. §371 National Phase Entry Application from PCT/EP2008/068163, filed Dec. 22, 2008, and designating the United States.

TECHNICAL FIELD

The present invention relates to first node in a wireless communication system, where the first node comprises at least two antenna ports, and is arranged for communication with a second node via a channel by means of at least one antenna radiation lobe. The second node comprises at least two antenna ports and is positioned at a certain direction in relation to the first node, and is arranged for transmitting one of at least two precoding weight set requests to the first node at certain times. Each transmitted precoding weight set request is chosen in dependence of the channel such that, by means of each precoding weight set request, the first node receives instructions for a certain beam-forming.

The present invention also related to a corresponding method.

BACKGROUND

The success of a Multiple Input Multiple Output (MIMO) system depends to a large extent on the characteristics of the channel. In a Frequency Division Duplex (FDD) system the Uplink (UL) carrier frequency differs from the Downlink (DL) carrier frequency.

In general, an FDD system does not have the same channel in UL as in DL, i.e. it is not reciprocal. This implies that the transmitter must inform the receiver what channel it sees and vice versa, to be able to direct energy in correct directions. Transmitting the full channel matrix is costly, and therefore not desired. An alternative, used in the 3rd Generation Partnership Project (3GPP) standard 36.x is to transmit an index corresponding to a set of weights.

A base station antenna can select one out of a certain number of precoding matrices. These precoding matrices will transmit the streams in predefined directions. However, the freedom to choose precoding weights is rather limited. The current standard does only support a rather course feedback to select precoding.

In other words, there is only a limited set of precoding matrices available, where each precoding matrix relates to certain weights for the antenna, and thus each precoding matrix is related to a certain antenna radiation lobe configuration. If a user terminal supplies feedback to the base station, the base station chooses a certain precoding matrix based on that feedback. That certain precoding matrix provides a certain antenna radiation lobe configuration, which probably is the best antenna radiation lobe configuration among the ones available due to the limited number of precoding matrices available. Even if it is the best antenna radiation lobe configuration, it does probably not provide an ultimate communication situation between the base station and the user terminal. In a worst case, the user terminal may be positioned between two adjacent lobes in the antenna radiation lobe configuration chosen.

It is thus desirable to acquire a more reliable method for providing an acceptable communication situation, where the antenna coverage available is better used.

SUMMARY

The object of the present invention is to acquire a more reliable method for providing an acceptable communication situation where the antenna coverage available is better used.

Said object is obtained by means of a first node in a wireless communication system, where the first node comprises at least two antenna ports, and is arranged for communication with a second node via a channel by means of at least one antenna radiation lobe. The second node comprises at least two antenna ports and is positioned at a certain direction in relation to the first node, and is arranged for transmitting one of at least two precoding weight set requests to the first node at certain times. Each transmitted precoding weight set request is chosen in dependence of the channel such that, by means of each precoding weight set request, the first node receives instructions for a certain beam-forming. The first node is arranged to apply such a beam-forming that the precoding weight set requests received from the second node have one certain distribution, of a set of at least one certain distribution, over a certain time period.

Said object is also obtained by means of a method for establishing communication between a first node and a second node in a wireless communication system, where the first node comprises at least two antenna ports, and may communicate with the second node via a channel using at least one antenna radiation lobe. The second node has at least two antenna ports and is positioned at a certain direction in relation to the first node. The method comprises the steps: the second node choosing each transmitted precoding weight set request in dependence of the channel such that, by means of each precoding weight set request, the first node receives instructions for a certain beam-forming; the second node transmitting one of at least two precoding weight set requests to the first node at certain times; and the first node applying such a beam-forming that the precoding weight set requests received from the second node have one certain distribution, of a set of at least one certain distribution, over a certain time period.

In an embodiment example, the first node is arranged or used to find an antenna radiation lobe pattern such that there is no precoding matrix preference.

According to another example, the received precoding weight set request distribution mainly relates to two antenna radiation lobe patterns such that the first node communicates with the second node via two adjacent radiation lobes.

According to another example, the first node comprises means for calculating a certain precoding weight set in dependence of the received precoding weight set request distribution.

According to another example, said certain precoding weight set corresponds to that the first node is arranged to direct a final radiation lobe in a certain direction.

According to another example, the first node is a base station and the second node is a user terminal, or vice versa.

Other examples are disclosed in the dependent claims.

A number of advantages are obtained by means of the present invention. Mainly, the antenna coverage available is better used.

BRIEF DESCRIPTION OF THE DRAWINGS

The present invention will now be described more in detail with reference to the appended drawings, where.

DETAILED DESCRIPTION

Figure 1:
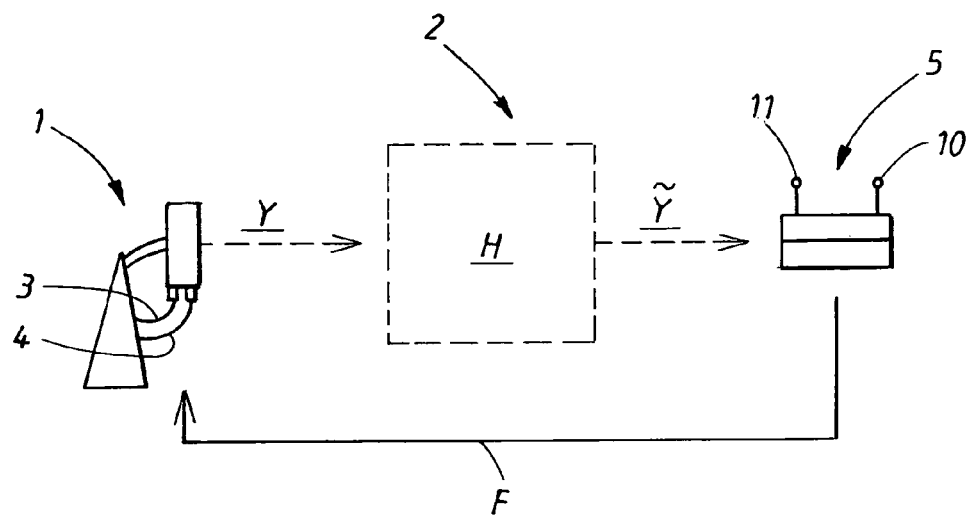
FIG. 1 schematically shows a system according to the present invention.
Figure 2:
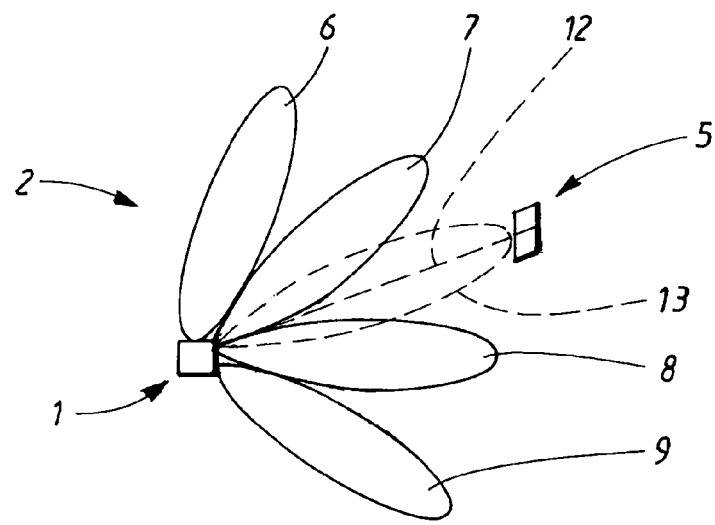
FIG. 2 schematically shows a top view of a system according to the present invention.

With reference to FIG. 1 and FIG. 2, there is a base station 1 in a wireless communication system 2, the base station having a first antenna port 3 and a second antenna port 4. The base station 1 communicates with a user terminal 5 via a first antenna radiation lobe 6, a second antenna radiation lobe 7, a third antenna radiation lobe 8 and a fourth antenna radiation lobe 9 over a channel H being defined by a channel matrix H. The user terminal 5 comprises a first antenna port 10 and a second antenna port 11. The user terminal 5 is positioned at a certain direction 12 in relation to the base station 1.

The transmitted signal y is transformed to a received signal ỹ when it has passed through the channel H.

The channel matrix H can be written in a singular value decomposition according to the following:

$$H = UDV^H. \quad (1)$$

Here, the matrix D is a diagonal matrix defining the gain each data stream sees, the unitary matrices U and V are base matrices and the superscript $^H$ denotes that it is the Hermitian transpose. A MIMO system is arranged to transmit a number of data streams related to the number of singular values in D exceeding some threshold. Once the number of streams has been decided, each stream is associated with one singular value and two singular-vectors, one from U and one from V. These singular-vectors are used as antenna element weights, where the vectors from V are used in the transmitter and the vectors from U are used in the receiver.

In a conventional Uniform Linear Array (ULA) the weights correspond to a set of spatially located zeros, meaning that energy will be radiated in azimuth directions which are not blocked by zeros. Equivalently, at the receiver side, the radiated energy is received from directions which are not blocked by zeros. Obviously, these non-blocked directions correspond to cluster locations in azimuth, facilitating transmission of the data stream.

The vector used at the transmitter differs from the vector used at the receiver, since the useful clusters have different angular position depending on observation point (Tx or Rx), and that the antennas may be different. The clusters are in the present context related to the structure of the channel, e.g. buildings etc. This implies that the position of the cluster is seen as a slowly varying channel property. In addition, a fast changing property of the channel is also present, e.g. fast fading.

In an example, the user terminal 5 provides an estimate $\hat{H}_{MS}$ of the channel H by using a pilot signal from the base station 1. Thus $$\hat{H}_{MS} = \hat{U}_{MS} \hat{D}_{MS} \hat{V}_{MS}^H$$

The sign ^ here denotes an estimation.

The user terminal 5 provides information to the base station 1 by sending $\hat{V}_{MS}$ to the base station via a feed-back channel F. The base station 1 uses $\hat{V}_{MS}$ when transmitting. Every column in the matrix $\hat{V}_{MS}$ constitutes a precoding vector, and provides beamforming for one MIMO stream.

The transmitted signal y is the matrix $\hat{V}_{MS}$ multiplied by a message x, i.e.

$$y = \hat{V}_{MS} x.$$

The received signal ỹ is written as:

$$\tilde{y} = Hy = H\hat{V}_{MS}x = U_{MS}D_{MS}V_{MS}^H \hat{V}_{MS}x,$$

where $V_{MS}^H \hat{V}_{MS}$ approximately is the identity matrix. For a perfectly known channel, $\hat{V}_{MS}$ is equal to $V_{MS}$ and the product is the identity matrix.

The received signal ỹ is multiplied with $\hat{U}_{MS}^H$:

$$\hat{U}_{MS}^H \tilde{y} \approx D_{MS} x.$$

The columns of V represent polynomials for which zeros can be computed. The zeros will attenuate signals from a direction corresponding to a specific, e.g. azimuth, direction. Hence, the vectors in V found at the user terminal 5 ideally instruct the base station 1 in what direction to send, or where not to send. However, in a code book approach such as in 3GPP, there is a limited number of matrices $V_{MS}$ to choose between, where these matrices form precoding matrices. The used direction may be far from the desired due to the coarse precoder codebook or precoder set.

The channel can be viewed as a stochastic process where the columns are random vectors in an N-dimensional complex space $C^N$; this implies that the channel decomposition, equation (1), also will be stochastic. However, the variation of the base function does to a large extent depend on the characteristics of the spatial spectrum. A spectrum which is characterized by peaks will have a basis function that describes those peaks. Consequently, if the environment causes peaks they will remain fixed for a reasonable long time, invariant to the randomness. In a flat spectrum there are no preferred directions and it does not really matter in what direction the energy is transmitted. Obviously, the positions of the zeros of V exhibit less variance for a peaky spectrum than do the zeros corresponding to a flat spectrum.

The approach taken in 3GPP to transmit the base vectors is to use a set of predefined vectors, each associated with an index. This can be seen as a quantization of the continuum of base matrices. In particular for the case of two antennas, the weight set is essentially comprised by two matrices.

In such case, and according to the present invention, the base station 1 is arranged to steer its antenna radiation lobe configuration such that the user terminal 5 will try to correct the base station 1 by requesting the best precoder selection. The process stops when a certain probability condition is fulfilled. Then it is known that the zero(s) lies in direction(s) given by the beam(s) selected by the base station 1. The probability condition typically states that the probability that either one of two adjacent antenna radiation lobes 7, 8 of the received precoding matrices is essentially equal. When the base station 1 steers its antenna radiation lobe configuration, in practice there is a number of antenna radiation lobe pattern; one for each different direction.

This information is used for directing a final antenna radiation lobe 13. Typically, the desired final lobe direction is between said adjacent antenna radiation lobes 7, 8.

Which precoder matrix $V_{MS}$, comprising precoding weight sets, that is desired by the user terminal 5 is generally transmitted from the user terminal 5 to the base station 1 in the form of a precoding weight set request.

Generally, the base station 1 arranges its antenna radiation lobe configuration in a certain way and analyzes the corresponding input from the user terminal 5. The user terminal 5 is thus being arranged for transmitting one of at least two precoding weight set requests to the base station 1 at certain times, where each transmitted precoding weight set request is chosen in dependence of the channel H such that, by means of each precoding weight set request, the base station 1 receives instructions for a certain beam-forming.

The base station 1 is arranged to apply such a beam-forming that the precoding weight set requests received from the second node (5) have one certain distribution, of a set of at least one certain distribution, over a certain time period.

The term distribution here relates to a certain probability distribution for the precoding weight set requests, where the certain distribution is obtained when a certain probability condition is fulfilled. For example, such a precoding weight set request distribution may comprise requesting two certain antenna radiation lobes 7, 8 mainly equally. In that case, the user terminal 5 requests that the base station 1 communicates with it via one of said certain antenna radiation lobes 7, 8 to an mainly equal degree.

An exemplary method relates to an approach based on COordinate Rotation DIgital Computer (CORDIC). The underlying assumption is that the direction which is to be blocked is fixed during a period of time. The description is made with respect to the processing at the base station 1, the user terminal 5 merely computes an index which is fed back, the index in this example relating to one of three precoding matrices W1, W2, W3. t is a running iteration time, S denotes the sign of the error, k is the number of a certain user terminal of a number of user terminals and N refers to index transmissions comprising statistics. The algorithmic outline is as follows:

1. Set t=0, $$\varphi = \frac{\pi}{8},$$

S=1
2. For the k:th user terminal, collect N index transmissions
3. Compute the difference $\epsilon = \#W_3 - \#W_2$, i.e. the difference between the number of times choice three and two has occurred.
4. Is the difference $\epsilon$ less than M observations, a solution is found, by a final 45° rotation.
5. Is $\epsilon > 0$ & S≠sign($\epsilon$), then t=t+1;
6. S=sign($\epsilon$)
7. Rotate the selected precoder by $-S\varphi 2^{-t}$
8. Goto step 2

The algorithm described above will rotate the precoder by an angle φ based on the selection. Each time the rotation is too large, the angle is halved and the rotation reversed. Here the term "too large" means that the user terminal favours the precoding matrix not favoured before, and that there is a preference of one or the other precoder.

The present method adapts to components in the channel which can be regarded as subject to slow variation. This can for example be related to structural objects in the channel, such as buildings. The information tracked is therefore related to the angular spectrum and a corresponding random variable $\eta = HH^H$. In case $\eta$ is stationary, a spectrum estimate can be computed as the average of several snapshots, this is termed averaging. Hence, the angular information is found via the second order moment of the channel. In addition, the random variable q may have an expected value. This expected value can be interpreted as a component of the angular spectrum.

In the general case, there is for example a ULA consisting of K elements and there are L precoding matrices. The strategy is for the base station 1 to find a beam constellation such that there is no precoding matrix preference. This also means that the base station 1 has placed zeros in the directions where the transmission optimally should have occurred. Evidently, by using the inverse spectrum as precoding matrix, all directions which were attenuated in the found solution will be amplified instead.

Figure 3:
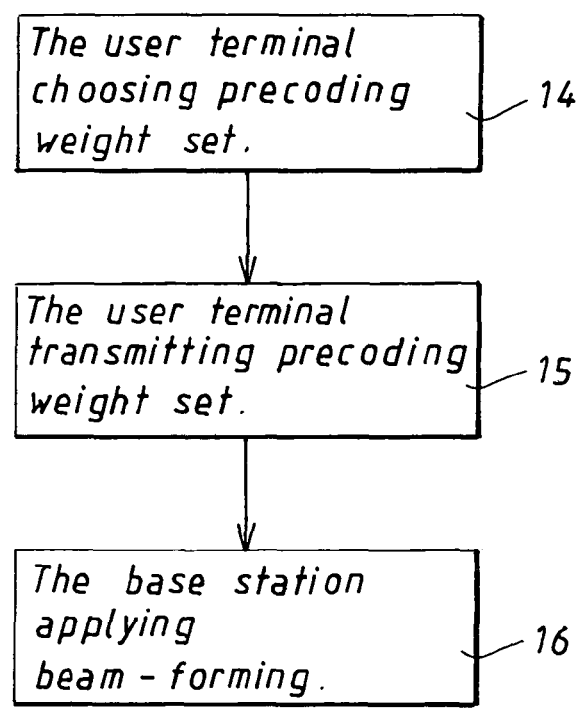
FIG. 3 shows a flow-chart for a method according to the present invention.

With reference to FIGS. 1-3, the present invention also relates to a method for establishing communication between a base station 1 and a user terminal 5 as described previously. The method comprises the steps:

14: The user terminal 5 choosing each transmitted precoding weight set request in dependence of the channel H such that, by means of each precoding weight set request, the base station 1 receives instructions for a certain beam-forming.

15: The user terminal 5 transmitting one of at least two precoding weight set requests to the base station 1 at certain times.

16: The base station 1 applying such a beam-forming that the precoding weight set requests received from the user terminal 5 have one certain distribution, of a set of at least one certain distribution, over a certain time period.

The present invention is not limited to the examples above, but may vary freely within the scope of the appended claims.

It is to be noted that the situation seldom is static; the user terminal 5 may be moving and the channel is in a state of change. Therefore, the result acquired by means of the present invention is often only valid for a limited time. Thus, by means of the present invention, the beam-forming applied by the base station has to be updated.

As an alternative, the present invention may work reciprocally, such that the base station 1 transmits precoding weight set requests to the user terminal 5. The present invention may also work both ways, such that the base station 1 transmits precoding weight set requests to the user terminal 5 and the user terminal 5 transmits precoding weight set requests to the base station 1.

There may a plurality of user terminals communicating with one or more base stations, or a plurality of base stations communicating with one or more user terminals.

The user terminal is for example constituted by a laptop or a cell phone.

The base station may for example be constituted by a repeater station.

The base station and the user terminal are in general terms referred to as nodes in a wireless communications system.

It is conceivable that the first node 1 informs the second node 5 explicitly where it intends to position its antenna radiation lobes. In such case, the first node does not direct its pilot transmission in a varying manner. Instead, the second node is instructed, via the explicit direction information, to compute the effect of radiation from said direction, and based on this select a weight set index. The procedure is iterated based on the explicit directives given from said first node.

The invention claimed is:

1. A first node in a wireless communication system, comprising:
   a first antenna port; and
   a second antenna port,
   wherein the first node is operable to communicate with a second node via a channel by at least one antenna radiation lobe, the second node comprising at least two antenna ports and being positioned at a certain direction in relation to the first node, the second node being arranged for transmitting one of at least two precoding weight set requests to the first node at certain times, each transmitted precoding weight set request being chosen in dependence of the channel such that, by each precoding weight set request, the first node receives instructions for a certain beam-forming, and wherein the first node is arranged to apply such a beamforming that the precoding weight set requests received from the second node have one certain probability distribution, of a set of at least one certain probability distribution, over a certain time period.

2. The first node according to claim 1, wherein the first node is arranged to find an antenna radiation lobe pattern such that there is no precoding matrix preference.

3. The first node according to claim 1, wherein the received precoding weight set request distribution mainly relates to two antenna radiation lobe patterns such that the first node communicates with the second node via two adjacent radiation lobes.

4. The first node according to claim 1, wherein the first node is configured to a certain precoding weight set in dependence of the received precoding weight set request distribution.

5. The first node according to claim 4, wherein said certain precoding weight set corresponds to that the first node is arranged to direct a final radiation lobe in a certain direction.

6. The first node according to claim 5, wherein the final radiation lobe is directed essentially between two adjacent radiation lobes.

7. The first node according to claim 1, wherein the first node is a base station and the second node is a user terminal.

8. The first node according to claim 7, wherein there are a number of user terminals, towards which the base station is arranged to direct its lobes.

9. The first node according to claim 1, wherein the first node is a user terminal and the second node is a base station.

10. The first node according to claim 1, wherein the direction between the first node and the second node mainly is determined in an azimuth plane.

11. The first node according to claim 1, wherein the certain distribution relates to a certain probability, where the certain distribution is obtained when a certain probability condition is fulfilled.

12. The first node according to claim 1, wherein the first node is arranged to steer an antenna radiation lobe configuration such that the second node will try to correct the first node by requesting a precoder selection, and
    wherein the first node is arranged to determine a final antenna lobe direction when the certain probability distribution is fulfilled.

13. The first node according to claim 1, wherein the certain probability distribution occurs when adjacent antenna radiation lobes from the first node communicate with the second node to a mainly equal degree.

14. A method for establishing communication between a first node and a second node in a wireless communication system, where the first node comprises at least two antenna ports and may communicate with the second node via a channel using at least one antenna radiation lobe, the second node having at least two antenna ports and being positioned at a certain direction in relation to the first node, the method comprising the steps:

the second node choosing each transmitted precoding weight set request in dependence of the channel such that, by each precoding weight set request, the first node receives instructions for a certain beam-forming; and the second node transmitting one of at least two precoding weight set requests to the first node at certain times, wherein the first node is configured to apply such a beamforming that the precoding weight set requests received from the second node have one certain probability distribution, of a set of at least one certain probability distribution, over a certain time period.

15. The method according to claim 14, wherein the first node is arranged to find an antenna radiation lobe pattern such that there is no precoding matrix preference.

16. The method according to claim 14, wherein the received precoding weight set request distribution mainly relates to two antenna radiation lobe patterns such that the first node communicates with the second node via two adjacent radiation lobes.

17. The method according to claim 14, wherein the first node is configured to calculate a certain precoding weight set in dependence of the acquired precoding weight set request distribution.

18. The method according to claim 17, wherein said certain precoding weight set corresponds to that the first node directs a final radiation lobe in a certain direction.

19. The method according to claim 18, wherein the final radiation lobe is directed essentially between said two adjacent radiation lobes.

20. The method according to claim 14, wherein the first node is a base station and the second node is a user terminal.

21. The method according to claim 20, wherein there are a number of user terminals, towards which the base station directs its lobes.

22. The method according to claim 14, wherein the first node is a user terminal and the second node is a base station.

23. The method according to claim 14, wherein the direction between the first node and the second node mainly is determined in an azimuth plane.

24. The method according to claim 14, wherein the certain distribution relates to a certain probability, where the certain distribution is obtained when a certain probability condition is fulfilled.

25. The method according to claim 14, wherein the first node is arranged to steer an antenna radiation lobe configuration such that the second node will try to correct the first node by requesting a precoder selection, and
    wherein the first node is arranged to determine a final antenna lobe direction when the certain probability distribution is fulfilled.

26. The method according to claim 14, wherein the certain probability distribution occurs when adjacent antenna radiation lobes from the first node communicate with the second node to a mainly equal degree.

* * * * *